2,810,709

LIGHT-STABLE PURE GUM BUTYL VULCANIZATES

Lawrence T. Eby, Linden, N. J., assignor to Esso Research and Engineering Company, a corporation of Delaware No Drawing. Application June 25, 1954,
Serial No. 439,470

6 Claims. (Cl. 260—45.9)

This invention relates to improvements in light stabilizers for low-unsaturation copolymers of isoolefins and conjugated diolefins.

One of the great difficulties with pure gum vulcanizates of the synthetic rubber known as butyl rubber and comprising the copolymerization product of an isoolefin, such as isobutylene and a multiolefin such as isoprene has been the fact that they are so easily degraded in molecular weight and so produce a tacky or oily surface after exposure to sunlight.

It is therefore a major object of the present invention to provide a stabilizer for pure gum butyl rubber which will satisfactorily resist the deleterious action of sunlight on the rubber and at the same time be attractive to the trade with regard to color, cost, availability, etc.

This and other objects of the present invention are accomplished by adding to the pure gum elastomer a small amount of a compound selected from the group consisting of p-dimethyl amino azobenzene, 4-dimethylaminobenzene - 1 - azo-1-naphthalene, parahydroxyazobenzene, 2,4-dinitro-diphenylamine, 2-amino-4-nitrophenol, and dibetanaphthol. Generally the additives of the present invention are most advantageously blended with the elastomer in concentrations between 0.1 and 5% by weight of the elastomer. The preferred elastomer is the low temperature interpolymer of isobutylene with a multiolefin having from 4 to 14 carbon atoms per molecule, such as butadiene, isoprene, dimethyl butadiene, myrcene, dimethallyl, or the like. This copolymer is prepared by cooling the olefinic material to a temperature within the range between −50° C. and −103° C.; the mixture being made up with a major proportion of isobutylene and a minor proportion of the diolefin; then treating the cold mixture with a solution of a Friedel-Crafts catalysts in solution in a low-freezing, non-complex-forming solvent, such as a solution of aluminum chloride in a halo-substituted aliphatic compound such as ethyl or methyl chloride or ethylene dichloride or chloroform, or the like, as shown in U. S. Patents Nos. 2,356,127 and 2,356,128.

The reaction proceeds promptly to yield the desired copolymer. It may be noted that in this reaction the preferred isoolefin is isobutylene, but that a wide choice of multiolefins is possible as above pointed out.

For the catalyst, any of the Friedel-Crafts catalysts may be used, such as are disclosed by N. O. Calloway in his article on "The Friedel-Crafts Synthesis," printed in "Chemical Reviews," volume XVII, No. 3 (1935), published at Baltimore for the American Chemical Society, the article beginning on page 327, the list of catalysts being particularly well shown on page 375. The solvent to be low-freezing must have a freezing point below 0° C.; to be non-complex forming, there shall not separate from the solution on evaporation of the solvent a compound formed by reaction between the solvent and the Friedel-Crafts catalyst. All of the aliphatic halosubstituted compounds having freezing points below 0° C. are usable as catalyst solvents without regard to the number of halosubstituents or the particular halogen used, and for the purposes of this application all are defined as "alkyl halides." Similarly, carbon disulfide and its analogs and homologs are also usable. With some of the Friedel-Crafts compounds, especially boron trifluoride, and aluminum bromide, the lower hydrocarbons such as ethane, ethylene, propane, butane, and the like, are also excellent catalyst solvents, since they also are low-freezing and non-complex-forming. In addition to the active metal halides disclosed by Calloway, a considerable number of double salts are equally effective as catalyst, including such substances as aluminum chlorobromide which has the potency of aluminum chloride and at the same time is soluble in hydrocarbons. Similarly, such compounds as aluminum or titanium chloro ethoxide are also usable as catalysts in this reaction.

The resulting polymer is a solid having a Staudinger molecular weight number within the range between about 20,000 and 150,000; a minimum molecular weight of about 20,000 being necessary for a curing reaction. The preferred range of molecular weight is from 35,000 to about 85,000, since polymers lower than 35,000 are undesirably low in tensile strength, and polymers above 85,000 are too tough to mill readily. The polymer likewise shows a relatively very low iodine number (according to the WIJS method) of from 0.5 to 50, the preferred range being between about 1 and 10. (The polymer, in spite of its very low unsaturation, is readily reactive with sulfur, particularly in the presence of curing aids, such as tetra methyl thiuram disulfide, in a curing reaction to yield a high-grade elastomer suitable for many of the uses to which rubber has previously been put.)

The advantages of the invention will be better understood from a consideration of the following experimental data which are given for the sake of illustration but without intention of limiting the invention thereto.

*Example 1*

Test slabs, 6 x 6 x 0.075 inches, were prepared from a commercial copolymer of isobutylene and isoprene known as GR–I. The amount of isoprene employed in the polymerization was about 2.5% of the amount of isobutylene. The vulcanized test slabs were prepared from the following formula:

| | Parts by weight |
|---|---|
| GR–I | 100 |
| Stearic acid | 1 |
| Zinc oxide | 5 |
| Sulfur | 1.5 |
| Tuads [1] | 1 |
| Additive | 2 |

[1] Tetra methyl thiuram disulfide.

Test slabs containing various stabilizer additives, and a control containing no additive, were cured for 60 minutes at 305° F. Strips, 3¾ x 1 inches, cut from the cured slabs, were looped and exposed outdoors towards the south according to ASTM test No. D518–44, Method B. The color and condition of the surface of each strip was noted before and after an exposure of four months at Linden, New Jersey, beginning in the month of January. The results of this test, as shown by the color and surface conditions of the samples before and after exposure to sunlight are listed in Table I.

TABLE I

| Additive | Color | | Surface Condition After Exposure |
|---|---|---|---|
| | Before Exposure | After Exposure | |
| None | very, very light tan | light gray | very oily. |
| p-Dimethylaminoazobenzene | yellow | orange | non-tacky. |
| 4-Dimethylaminobenzene-1-azo-1-naphthalene | brown orange | red | Do. |
| p-hydroxyazobenzene | yellow | light brown | tacky. |
| Azoxybenzene | very, very light tan | very light yellow tan | very tacky. |
| Bismark Brown [1] | dark brown | very dark gray violet | Do. |
| Brilliant Yellow [1] | tan | brown | Do. |
| Chrysoidin R [1] | dark brown | dark gray brown | oily. |
| Chrysoidin Y [1] | very dark brown | very dark gray brown | Slightly tacky; tacky edge |
| Chrysophenin [1] | orange yellow | tan | oily. |
| Congo Red [1] | orange red | dark violet red | very tacky. |
| Diazine Green [1] | very dark blue | very dark blue | oily. |
| Evans Blue [1] | very blue | dark blue gray | Do. |
| p-Nitrobenzeneazo-α-naphthol | very dark brown | very dark brown | very tacky. |
| p-Nitrobenzeneazoresorcinol | dark brown | dark gray brown | Do. |
| Orange IV [1] | tan | dark brown | oily. |
| Scarlet Red [1] | dark red | dark violet red | very tacky. |
| Na p-dimethylaminoazobenzene-p-carboxylate | light orange brown | light brown | oily. |
| Na p-hydroxyazobenzene-p-sulfonate | light tan | light tan | Do. |
| Sudan III [1] | red | dark red | very tacky. |
| Thiodiphenylamine | light green tan | dark brown | non-tacky. |
| Resorufin [1] | dark violet | same | Do. |
| α-phenylhydrazoquinoline | dark gray brown | almost black | Do. |
| p-nitrosodiphenylamine | very dark green | black | Do. |
| Indigotin [1] | dark blue violet | same | slightly tacky. |
| Diphenylnitrosoamine | light tan | gray tan | Do. |
| 2,4-Dinitrodiphenylamine | yellow orange | yellow | tacky. |
| Di-B-naphthol | very, very light tan | tan | very tacky. |
| 2-Amino-4-nitrophenol | yellow green | gray tan | Do. |

[1] Structural formulae for compounds listed by common name:

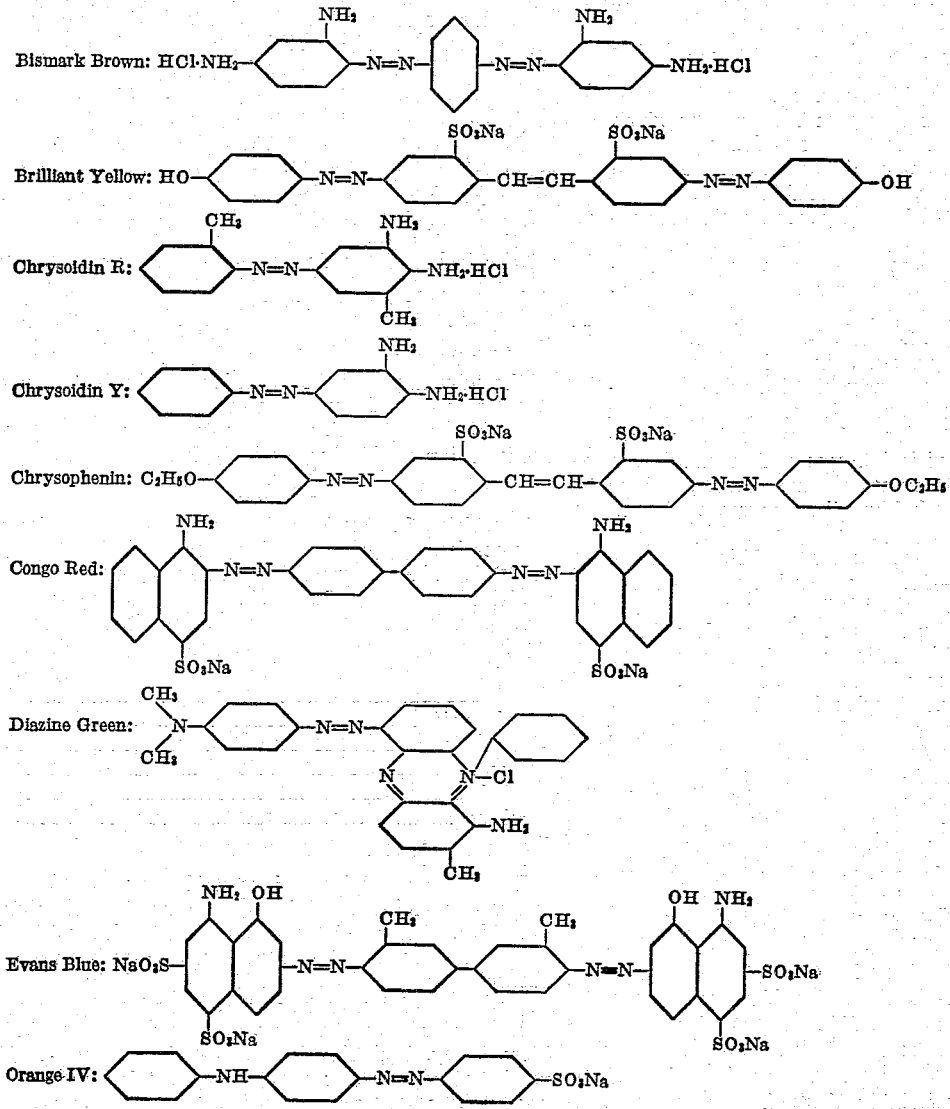

Footnote continued on following page.

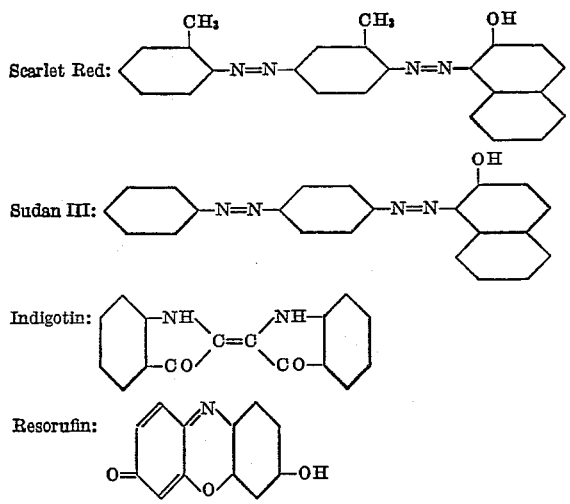

In view of the above data it is obvious that the cured test strip containing no additive was very slightly tacky before exposure. The increasing order of surface degradation is from non-tacky to tacky, to very tacky, to oily (surface), to very oily (surface). The only azo compound tested which prevented surface degradation to a large extent, other than the first three listed, was Chrysoidin Y, which, however, imparted too dark a color to be of practical value as a stabilizer.

Out of many compounds tested, in the manner described, for the prevention of surface degradation in sunlight, only a very few gave protection without severe darkening of the pure gum butyl rubber. These were p-dimethylaminoazobenzene, 4-dimethylaminobenzene-1-azo-1-naphthalene, p-hydroxyazobenzene, 2,4-dinitrodiphenylamine, 2-amino-4-nitrophenol, and di-beta-naphthol. Five others which prevented surface degradation but gave colors ranging from dark brown to black after exposure of the butyl rubber to sunlight, were thiodiphenylamine, indigotin, resorufin, alpha-phenylhydrazoquinoline, and p-nitrosodiphenylamine.

The nature and objects of the present invention having been thus fully set forth and specific examples of the same given, what is claimed as new and useful and desired to be secured by Letters Patent is:

1. A composition of matter comprising a cured low unsaturation copolymer of a major proportion of an iso-olefin and a minor proportion of a diolefin containing 0.1 to 2% by weight of a compound selected from the group consisting of p-dimethylaminoazobenzene, 4-dimethylaminobenzene-1-azo-1-naphthalene, parahydroxyazobenzene, 2,4-dinitro-diphenylamine, 2-amino-4-nitrophenol, and di-betanaphthol.

2. Composition according to claim 1 in which the compound is 4-dimethylaminobenzene-1-azo-1-naphthalene.

3. Composition according to claim 1 in which the compound is parahydroxyazobenzene.

4. Composition according to claim 1 in which the compound is 2,4-dinitro-diphenylamine.

5. Composition according to claim 1 in which the compound is di-betanaphthol.

6. A composition of matter comprising a cured low unsaturation copolymer of a major proportion of an iso-olefin and a minor proportion of a diolefin containing 0.1 to 2% by weight of p-dimethylaminoazobenzene.

References Cited in the file of this patent

UNITED STATES PATENTS

| | | |
|---|---|---|
| 1,959,110 | Scott et al. | May 15, 1934 |
| 2,406,722 | Vincent | Aug. 27, 1946 |
| 2,462,123 | Nelson | Feb. 22, 1949 |